US009828190B2

United States Patent
Gahler

(10) Patent No.: US 9,828,190 B2
(45) Date of Patent: Nov. 28, 2017

(54) CONVEYING DEVICE WITH A MAGNETIC COUPLING

(71) Applicant: GEA CFS BUHL GMBH, Kempten (DE)

(72) Inventor: Thomas Gahler, Goerisried (DE)

(73) Assignee: GEA Food Solutions Germany GmbH, Biedenkoph-Wallau ( * ) Notice: Subject to any disclaimer, the term of this patent is extended or adjusted under 35 U.S.C. 154(b) by 70 days.

(21) Appl. No.: 14/710,871

(22) Filed: May 13, 2015

(65) Prior Publication Data

US 2015/0239678 A1    Aug. 27, 2015

Related U.S. Application Data

(62) Division of application No. 13/904,340, filed on May 29, 2013, now Pat. No. 9,061,840.

(30) Foreign Application Priority Data

Jun. 1, 2012 (DE) .................. 10 2012 010 802

(51) Int. Cl.
| | |
|---|---|
| B65G 21/08 | (2006.01) |
| B65G 47/64 | (2006.01) |
| B65G 43/00 | (2006.01) |
| B65G 19/28 | (2006.01) |

(52) U.S. Cl.
CPC ........... B65G 47/647 (2013.01); B65G 43/00 (2013.01); B65G 47/642 (2013.01); B65G 2207/40 (2013.01); Y10T 403/16 (2015.01)

(58) Field of Classification Search
CPC ......... B65G 47/78; B65G 43/08; E05C 17/56; H01F 7/02

USPC ........... 24/303; 292/251.5; 198/735.3, 735.4, 198/530, 531, 860.4

See application file for complete search history.

(56) References Cited

U.S. PATENT DOCUMENTS

| | | | |
|---|---|---|---|
| 6,578,703 B2 | 6/2003 | Humphrey et al. | |
| 6,848,568 B1 * | 2/2005 | Nibler | B65G 27/34 198/502.2 |
| 7,124,876 B2 | 10/2006 | Wolf | |
| 2010/0283269 A1 * | 11/2010 | Fiedler | A44B 11/258 292/251.5 |
| 2010/0325844 A1 * | 12/2010 | Fiedler | A44B 11/25 24/303 |

(Continued)

FOREIGN PATENT DOCUMENTS

| | | |
|---|---|---|
| DE | 7627260 U1 | 10/1977 |
| DE | 3990331 | 2/1991 |

(Continued)

OTHER PUBLICATIONS

European Search Report, Application No. 13169608.0, dated Aug. 21, 2013.

(Continued)

Primary Examiner — James R Bidwell
(74) Attorney, Agent, or Firm — The Dobrusin Law Firm, P.C.

(57) ABSTRACT

The invention relates to a conveying device having a first and a second conveyor belt and a moveable turnout which directs a flow of products onto the first and/or second conveyor belt.

13 Claims, 5 Drawing Sheets

(56) References Cited

U.S. PATENT DOCUMENTS

| | | | | |
|---|---|---|---|---|
| 2011/0139588 A1* | 6/2011 | Petri | ...................... | B65G 27/34 |
| | | | | 198/771 |
| 2013/0192955 A1† | 8/2013 | Lischinski | | |
| 2013/0305609 A1* | 11/2013 | Graves | ................ | E05B 47/0012 |
| | | | | 49/168 |
| 2016/0235174 A1* | 8/2016 | Lenci | ...................... | A41F 1/002 |

FOREIGN PATENT DOCUMENTS

| | | | |
|---|---|---|---|
| DE | 102004008330 | | 9/2005 |
| DE | 102009039826 | | 3/2011 |
| EP | 0314948 | A1 † | 10/1988 |
| EP | 0317078 | | 5/1989 |
| JP | 11-283999 | | 10/1999 |

OTHER PUBLICATIONS

German Search Report, Application No. 102012010802.8, dated Nov. 30, 2012.

\* cited by examiner
† cited by third party

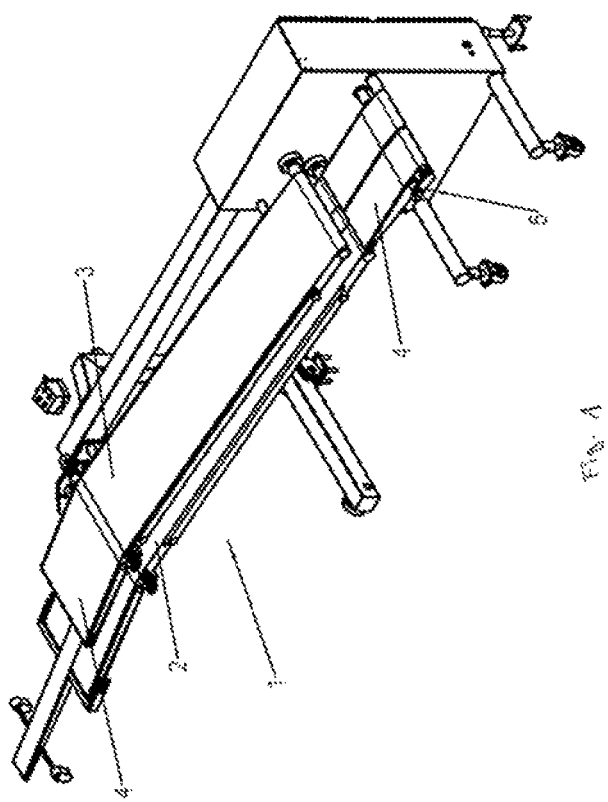

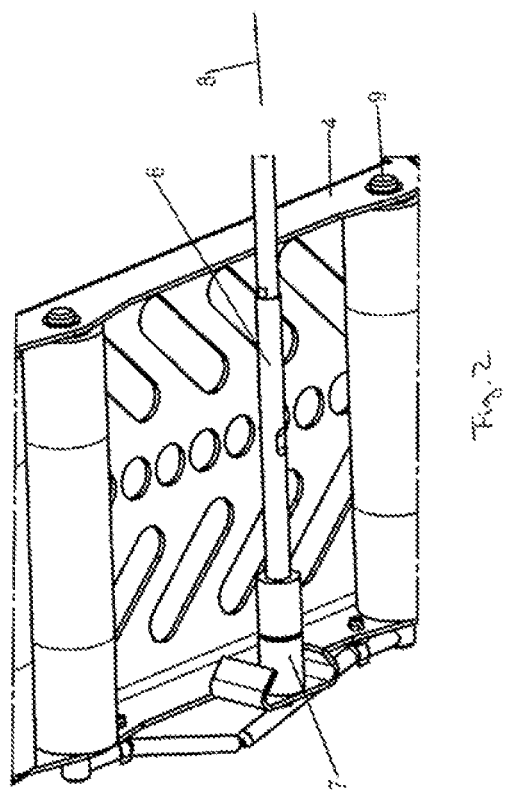

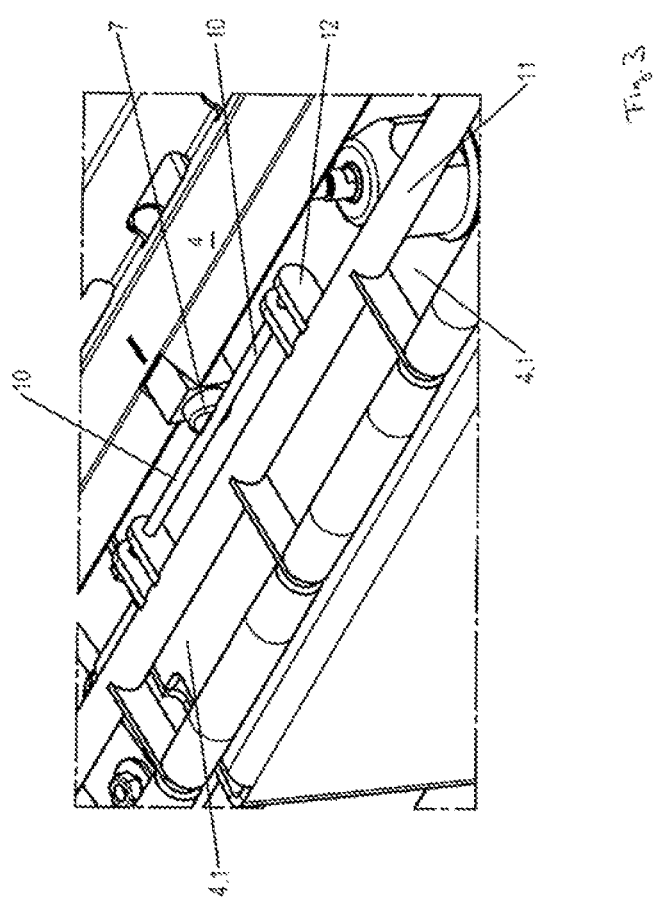

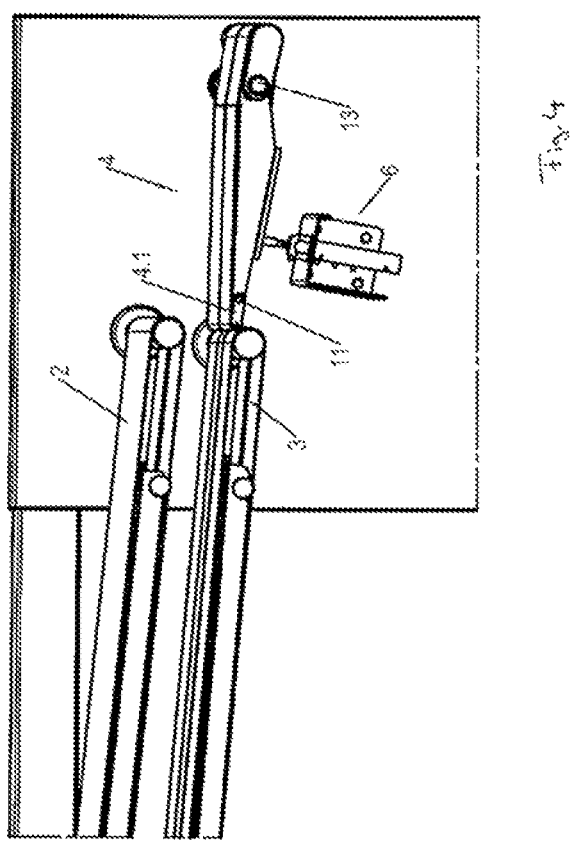

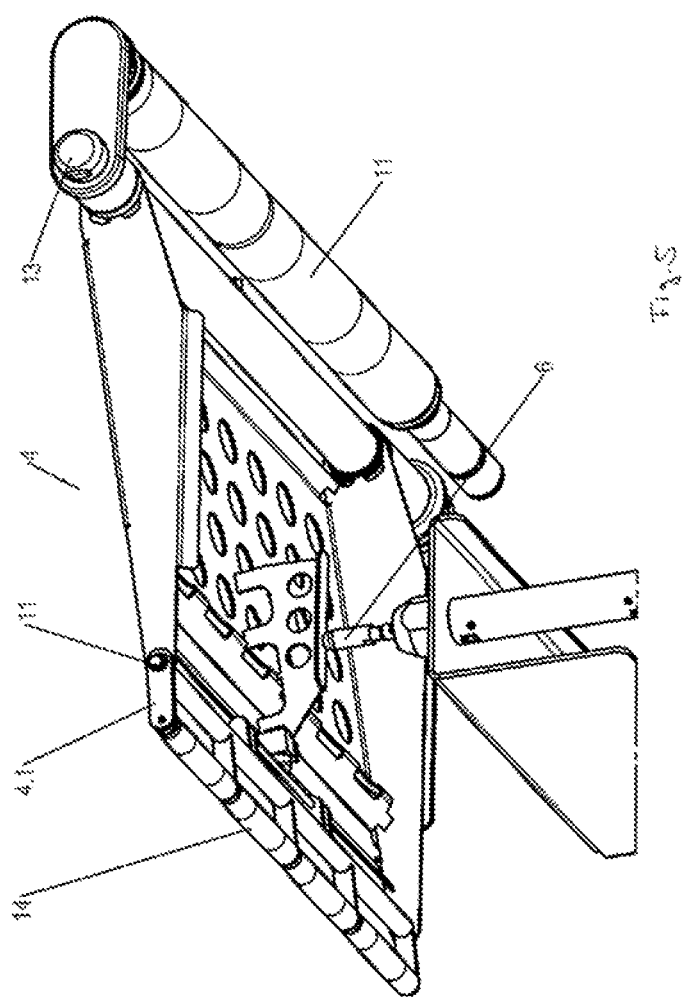

CONVEYING DEVICE WITH A MAGNETIC COUPLING

CLAIM OF BENEFIT OF FILING DATE

The present application claims the benefit of the filing date of German Patent Application DE 10 2012 010 802.8, filed Jun. 1, 2012, the contents of which are hereby incorporated by reference in its entirety.

FIELD OF THE INVENTION

The present invention relates to a conveying device having a first and at least one second conveyor belt and a moveable turnout which directs a flow of products onto the first and/or second conveyor belt.

BACKGROUND OF THE INVENTION

Conveying devices of the generic type are adequately known from the prior art and are used, for example, for the buffer storage of products and/or for the completion of batches which consist of a multiplicity of individual items, and/or formats. In this context, a turnout, in particular a seesaw, which preferably also has a conveying means, is moved to and fro between the conveyor belts in order to direct products to or away from one of the conveyor belts, as required. It is in particular when the seesaw moves towards one of the transport belts that there is an increased risk of accidents for the operators.

It was thus the object of the present invention to provide a conveying device which does not have the disadvantages of the prior art.

The object is achieved by a conveying device having a first and at least one further conveyor belt and a moveable turnout which has a drive and which directs a flow of products onto the first and/or the further conveyor belt or away from there, the turnout having a, preferably reversible, predetermined opening point which, in the case of an overload, prevents personal injury or property damage.

The statements made in relation to this subject of the present invention also apply to the other subjects of the present invention and vice versa.

SUMMARY OF THE INVENTION

The present invention relates to a conveying device having a first and at least one further conveyor belt. These conveyor belts may be provided, for example, above one another or beside one another. A turnout, for example a seesaw, is located between the conveyor belts, and directs the arriving flow of products onto the first and/or the further conveyor belt. The conveying device according to the invention may have a second turnout which directs the products away from the conveyor belts again. According to the invention, each turnout is provided with a drive which moves said turnout to and fro between the two conveyor belts.

According to the invention, the conveying device now has a predetermined opening point, preferably a reversible predetermined opening point, that is to say a predetermined opening point which is easily repairable, in particular a predetermined opening point which is self-repairing. By means of the predetermined opening point, two parts are separated. In the event of an overload on the turnout, for example when the turnout impinges on an obstacle, this predetermined opening point prevents injury to operators and/or property damage to one of the conveyor belts or the turnout.

An overload in the sense of the invention occurs when forces and/or momenta which exceed the usual level required during operation are necessary in order to, for example, move the turnout. Such overload events occur, for example, when the turnout impinges on an obstacle.

According to the invention, the predetermined opening point is a magnetic coupling. In the event of an overload, those parts of the magnetic coupling of the conveying device according to the invention which are magnetically connected to one another are separated from one another. As soon as the overload discontinues again, these parts can be joined together again and are connected again by the magnetic forces, and the conveying device is fully operational again. In particular, the magnetic coupling is self-repairing. The magnetic coupling is an example of a reversible predetermined opening point. The magnetic coupling preferably has at least one, preferably two magnets which are separable from one another in the event of an overload.

Preferably, the predetermined opening point is located between the drive and the turnout. For example, the drive is a linear drive with a piston and a cylinder. Here, the predetermined opening point is particularly preferably located in the region of the piston.

The magnetic coupling is preferably provided in the region of a shaft, in particular a drive shaft, and here preferably provided between the drive and the turnout. The maximum torque which is transferable is limited by the magnetic coupling.

Alternatively, the predetermined opening point is provided in a rod assembly if the tensile force in the rod assembly becomes too great, two parts of the predetermined opening point separate.

The turnout is preferably provided in multiple parts and has a base part and one, preferably front, section facing the conveyor belts, said front section being provided moveably, preferably pivotably, in relation to the base part. The predetermined opening point is particularly preferably located between this front section and the turnout. This may, for example, positively prevent the operators from trapping their fingers between the turnout and one of the conveyor belts and/or the turnout or its drive from being damaged.

The predetermined opening point is preferably self-closing, that is to say self-repairing, upon discontinuation of the overload. Self-closing self-repairing according to the invention means that the parts of the predetermined opening device which have separated in the event of an overload automatically reconnect with one another and that the conveying device according to the invention thus regains its full operability. This preferred embodiment of the present invention has the advantage that the predetermined opening point repairs itself as soon as the obstacle has been removed.

The conveying device preferably has a sensor which detects the activation of the predetermined opening point. This sensor transmits a signal to a controller such that the latter recognizes that the conveying device is not operational. As soon as the predetermined opening device has been repaired again, the signal from the sensor is cancelled and the conveying device may continue its operation.

A further subject of the present invention is a method for securing a component having a predetermined opening point which has two parts which separate from one another in the event of an overload, wherein the two parts automatically join together again upon discontinuation of the overload.

The statements made in relation to this subject of the present invention also apply to the other subjects of the present invention and vice versa.

The method according to the invention has the advantage that the predetermined opening point repairs itself as soon as the obstacle has been removed.

Preferably, a drive is provided which brings both parts of the predetermined opening point back together again after their separation. The drive preferably pulls or pushes apart the two parts of the predetermined opening point in one direction of movement in the event of an overload. If the direction of movement of the drive is then reversed, the drive automatically joins the two parts together again. The movement of the drive is preferably linear or rotatory.

Gravity preferably brings both elements together again after their separation. As soon as the obstacle which has caused the overload event has been removed, one part of the predetermined opening point moves towards the other as a result of gravity, thereby joining the two parts of the predetermined opening point together again.

DESCRIPTION OF THE DRAWINGS

In the following, the inventions are described with reference to FIGS. 1 to 5. These descriptions are merely exemplary and do not limit the general idea of the invention.

FIG. 1 shows the conveying device according to the invention.

FIG. 2 shows a first exemplary embodiment of a turnout.

FIGS. 3 to 5 show a further embodiment of a turnout.

DETAILED DESCRIPTION

FIG. 1 shows the conveying device 1 according to the invention. This has a first and a second conveyor belt 2, 3 which in the present case are located one above the other. The person skilled in the art will recognize that the conveying device may also have more than two conveyor belts. Each conveyor belt 2, 3 preferably has a driven endless belt or driven endless belts which preferably circulate around at least two rollers. Preferably, at least one of the rollers is driven. Located between the two conveyor belts 2, 3 is a turnout 4 by means of which it is possible to direct an incoming flow of products (not illustrated) onto the lower and/or the upper conveyor belt 2, 3. A segregation of the incoming flow of products is desirable, for example, in order to remove products and/or to store them temporarily on one of the conveyor belts. In the present case, the turnout 4 is provided pivotably about a pivot joint 5. As illustrated in FIG. 1, the conveying device 1 according to the invention may have a further turnout 4, which makes it possible in the present case to transfer products from the conveyor belt 3 onto the conveyor belt 2. Each turnout 4 preferably has a driven endless belt or driven belts which preferably circulate about at least two rollers. Preferably, one of the rollers is driven.

FIG. 2 shows a first embodiment of a turnout 4. In the present case, the turnout 4 is borne, depending on length, by at least one axial bearing 9. The movement of the turnout 4 is symbolized by the double arrow 8. A turnout of this type is particularly suited to conveyor belts 2, 3 which are located beside one another. The movement of the turnout 4 in the present case takes place by way of a drive (not illustrated) which, for example, has a piston 6 which moves the turnout towards the right and the left. The predetermined opening point 7, in the present case in the form of two permanent magnets, is provided here on this piston. If the force which is required to move the turnout 4 from left to right is too great, the two permanent magnets detach from one another and the turnout 4 is not moved any farther. In this manner, an injury to an operator of the conveying device according to the invention and/or property damage to the turnout 4 or to one of the conveyor belts 2, 3 may be positively prevented. As soon as the piston 6 then moves again from left to right, the two parts, in this case of the permanent magnets, of the predetermined opening point 7 come into contact with one another again, such that the predetermined opening point is repaired again and the turnout 4 is duly operable again. As a result, there is only a minimal loss of production on the part of the conveying device 1 according to the invention.

In FIGS. 3 to 5, another embodiment of the turnout 4 of the conveying device 1 according to the invention is illustrated. As can be seen in particular in FIG. 4, the turnout 4 in this case is provided pivotably about a pivot bearing 13 in order to direct an incoming flow of products onto the conveyor belt 3 and/or the conveyor belt 2. The turnout 4 is rotationally driven clockwise and anti-clockwise, in the present case by the drive 6, here a linear drive. In the present case, the turnout 4 has on its end which faces the conveyor belts a movable component 4.1 which is pivotably mounted about a pivot axle 11 which is provided on the base part of the turnout 4. Details of this mounting may be seen in particular in FIG. 3. It is clearly evident that the front end 4.1 of the turnout 4 is mounted pivotably about the pivot bearing 11. It is further evident that the turnout 4 in the present case is provided in two parts. The separation of the two parts occurs at an angle of 90° to the pivot axle 13. Each part of the turnout 4 may be individually pivoted or both parts may be collectively pivoted about the pivot axle 13. Each front end 4.1 of the turnout 4 is individually secured on the base part of the turnout 4 by a securing means 10 which prevents the front end 4.1 from automatically pivoting in relation to the base part of the turnout 4. It is only in the event of an overload that the front end 4.1 is intended to pivot in relation to the base part of the turnout 4. For this purpose, a permanent magnet, which is mounted on the base part of the turnout 4, is provided between the two securing pins and prevents the front end 4.1 from moving in relation to the base part under operational loads. The force-fit between the permanent magnet and the respective securing means represents the predetermined opening point. In the present case, one permanent magnet is provided for both securing pins 10. The person skilled in the art will understand that each securing means may have its own permanent magnet. In the event of an overload, the securing means detaches itself from the permanent magnet, and the front end 4.1 may pivot in relation to the base part of the turnout. In such a manner, personal injury and/or property damage are avoided. As soon as the overload is discontinued, the securing means is again connected to the permanent magnet, for example by force of gravity acting on the front end 4.1, and the proper operation of the turnout is restored. Under overload, the predetermined opening point functions in both directions of rotation.

LIST OF REFERENCE SIGNS

1 Conveying device
2 First conveyor belt
3 Second conveyor belt
4 Turnout, component
4.1 Front end of the turnout, front end of the component
5 Pivot bearing of the turnout 6 Drive
7 Reversible predetermined opening point, magnetic coupling
8 Direction of motion
9 Axial bearing
10 Securing means, securing pin
11 Pivot bearing of the font end 4.1
12 Bearing of the securing means
13 Pivot bearing of the turnout
14 Roller

The invention claimed is:

1. A method comprising:

securing a component having a reversible predetermined opening point, and which has two parts which separate from one another in an event of an overload in order to prevent personal injury or property damage, the predetermined opening point being a magnetic coupling, the two parts comprising a front section and a base part, wherein the two parts join together again by gravitational force in a force-fitting manner upon discontinuation of the overload, wherein the component is a turnout that has a drive, the turnout pivots around a pivot axle to direct a flow of products onto a first conveyor belt and to direct the flow of the products onto a second conveyor belt, which is vertically offset from the first conveyor belt, and wherein the front section of the turnout, which faces the first conveyor belt and the second conveyor belt, pivots about the pivot axle relative to the base part of the turnout in the event of the overload.

2. The method according to claim 1, wherein the drive brings the two parts back together again after their separation.

3. The method according to claim 1, wherein the magnetic coupling has at least one magnet.

4. The method according to claim 1, wherein the predetermined opening point is located between the drive and the turnout.

5. The method according to claim 1, wherein the predetermined opening point is located between a front section and the turnout.

6. The method according to claim 1, wherein the predetermined opening point is provided in a region of a shaft of the turnout.

7. The method according to claim 1, wherein the method includes a step of the predetermined opening point self-closing upon discontinuation of the overload.

8. The method according to claim 1, wherein the method includes a step of detecting activation of the predetermined opening point with a sensor.

9. A method comprising:

1. securing a component to a conveying device, the component having:
    i. a predetermined opening point, and which has two separate parts, the two separate parts comprise a front section and a base part, the front section is pivotable about a pivot axle relative to the base part, and
    ii. a coupling with at least one magnet;
2. separating the two separate parts by way of the front section pivoting relative to the base part about the pivot axle while the base part is free from pivoting in an event of an overload so that personal injury or property damage are prevented;
3. joining the two parts together in a force fitting manner upon discontinuation of the overload;

wherein the predetermined opening point is provided in a region of a shaft of a turnout, wherein the component is a turnout that has a drive, the turnout pivots about a pivot bearing to a first position to direct a flow of products onto a first conveyor belt of the conveying device and pivots about the pivot bearing to a second position to direct the flow of the products onto a second conveyor belt of the conveying device, wherein the first conveyor belt is located vertically above the second conveyor belt, and wherein the predetermined opening point is located between the drive and the turnout, and comprises a magnetic coupling that has two magnets.

10. The method according to claim 9, wherein the drive joins the two parts back together upon discontinuation of the overload.

11. The method according to claim 9, wherein gravity brings the two parts together again upon discontinuation of the overload.

12. The method according to claim 9, wherein the method includes a step of the predetermined opening point self-closing upon discontinuation of the overload.

13. The method according to claim 9, wherein the method includes a step of detecting activation of the predetermined opening point with a sensor.

* * * * *

UNITED STATES PATENT AND TRADEMARK OFFICE
CERTIFICATE OF CORRECTION

PATENT NO. : 9,828,190 B2  
APPLICATION NO. : 14/710871  
DATED : November 28, 2017  
INVENTOR(S) : Thomas Gahler Page 1 of 1

It is certified that error appears in the above-identified patent and that said Letters Patent is hereby corrected as shown below:

In the Claims

Column 5, Line 40, Claim 5, delete "a" and replace with --the--

Signed and Sealed this  
Nineteenth Day of June, 2018

Andrei Iancu  
*Director of the United States Patent and Trademark Office*